US008442977B2

(12) United States Patent
McCloskey et al.

(10) Patent No.: US 8,442,977 B2
(45) Date of Patent: May 14, 2013

(54) DISTANCE-SPACE EMBEDDING FOR MULTI-DESCRIPTOR MATCHING AND RETRIEVAL

(75) Inventors: Scott McCloskey, Minneapolis, MN (US); Ben A. Miller, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 517 days.

(21) Appl. No.: 12/706,177

(22) Filed: Feb. 16, 2010

(65) Prior Publication Data

US 2011/0202527 A1 Aug. 18, 2011

(51) Int. Cl.
*G06F 17/30* (2006.01)

(52) U.S. Cl.
USPC ............ 707/728; 707/749; 707/769; 707/794

(58) Field of Classification Search .................. 707/728, 707/749, 769, 794
See application file for complete search history.

(56) References Cited

U.S. PATENT DOCUMENTS

| 5,734,893 | A | 3/1998 | Castelli et al. | |
|---|---|---|---|---|
| 5,991,755 | A * | 11/1999 | Noguchi et al. | 1/1 |
| 6,192,150 | B1 * | 2/2001 | Leow et al. | 382/190 |
| 6,480,841 | B1 * | 11/2002 | Higashio et al. | 1/1 |
| 6,578,031 | B1 * | 6/2003 | Washizawa | 1/1 |
| 6,629,097 | B1 * | 9/2003 | Keith et al. | 707/600 |
| 7,272,593 | B1 * | 9/2007 | Castelli et al. | 707/600 |
| 7,668,856 | B2 * | 2/2010 | Ganguly et al. | 707/769 |
| 7,761,454 | B2 * | 7/2010 | Smyth et al. | 707/749 |
| 8,082,263 | B2 * | 12/2011 | Ma et al. | 707/758 |
| 8,090,709 | B2 * | 1/2012 | Liu et al. | 707/713 |
| 2007/0131094 | A1 * | 6/2007 | Kemp | 84/609 |
| 2009/0040225 | A1 * | 2/2009 | Wang et al. | 345/427 |

OTHER PUBLICATIONS

"Great Britain Application Serial No. 1019589.9, Combined Search and Examination Report mailed Mar. 15, 2011", 7 pgs.
"Great Britain Application Serial No. 1019589.9, Response filed Oct. 17, 2011 to Examination Report mailed Mar. 15, 2011", 11 pgs.
"United Kingdom Application No. 10 195 89.9—Office Action Received", 2 pgs.

* cited by examiner

*Primary Examiner* — John E Breene
*Assistant Examiner* — Andalib Lodhi
(74) *Attorney, Agent, or Firm* — Schwegman, Lundberg & Woessner, P.A.

(57) ABSTRACT

A process includes receiving an archive of video data comprising a plurality of archive descriptor types, and applying a query to the archive. The query includes a number of N query descriptor types for a query object. The process further includes determining a difference between each query descriptor type and corresponding descriptor types of the archive, and storing each difference as a point in an N dimensional space. The process further includes identifying an archive object that is similar to the query object as a function of proximities of the differences to an origin of the N dimensional space.

20 Claims, 5 Drawing Sheets

$W_Q - W_A = P_1$
$H_Q - H_A = P_2$
$V_Q - V_A = P_3$
$M_Q - M_A = P_4$

Q=QUERY
A=ARCHIVE

DISTANCE SPACE=$(P_1, P_2, P_3, P_4)$

DISTANCE-SPACE EMBEDDING FOR MULTI-DESCRIPTOR MATCHING AND RETRIEVAL

GOVERNMENT INTEREST

This invention was made with Government support under Grant Number HR0011-08-C-0135-S1 awarded by the Defense Advanced Research Projects Agency (DARPA). The United States Government has certain rights in the invention.

TECHNICAL FIELD

The present disclosure relates to the processing of video data, and in an embodiment, but not by way of limitation, matching and retrieving objects from video data using distance-space embedding of multiple descriptors.

BACKGROUND

Video-based object and activity recognition and retrieval systems use a variety of descriptors to represent visual attributes. In systems that handle broad categories of objects and activities, no single descriptor type will normally suffice to represent all of the necessary attributes. For example, in activity recognition, there are normally two broad categories of activities. First, there are articulated activities, which are characterized by motion of a person's arms and legs or the motion of parts of a vehicle (e.g., doors) or other object. Second, there are non-articulated activities, which are characterized by whole body or object motion, such as a vehicle turning or simply moving forward. No single descriptor has the power to represent both articulated and non-articulated activities. As a result, systems use multiple descriptor types to handle both types of activities. Another example could be object recognition which uses other descriptor types, some of which are based on color, texture, rigidity, and shape.

The use of multiple descriptor types however complicates many of the steps used in recognition and retrieval systems. For example, descriptors of different types cannot be compared. However, there are two high level types of approaches to address this issue of the inability to compare descriptors of different types. First, there are approaches that perform retrieval on individual descriptors and combine results. Second, there are approaches that attempt retrieval based on heterogeneous sets of descriptors.

The subject matter described in this background section could be pursued, but it has not necessarily been previously conceived or pursued. Therefore, unless otherwise indicated herein, the subject matter described in this background section is not prior art to the claims in this application and is not admitted to be prior art by inclusion in this background section.

DETAILED DESCRIPTION

Figure 1:
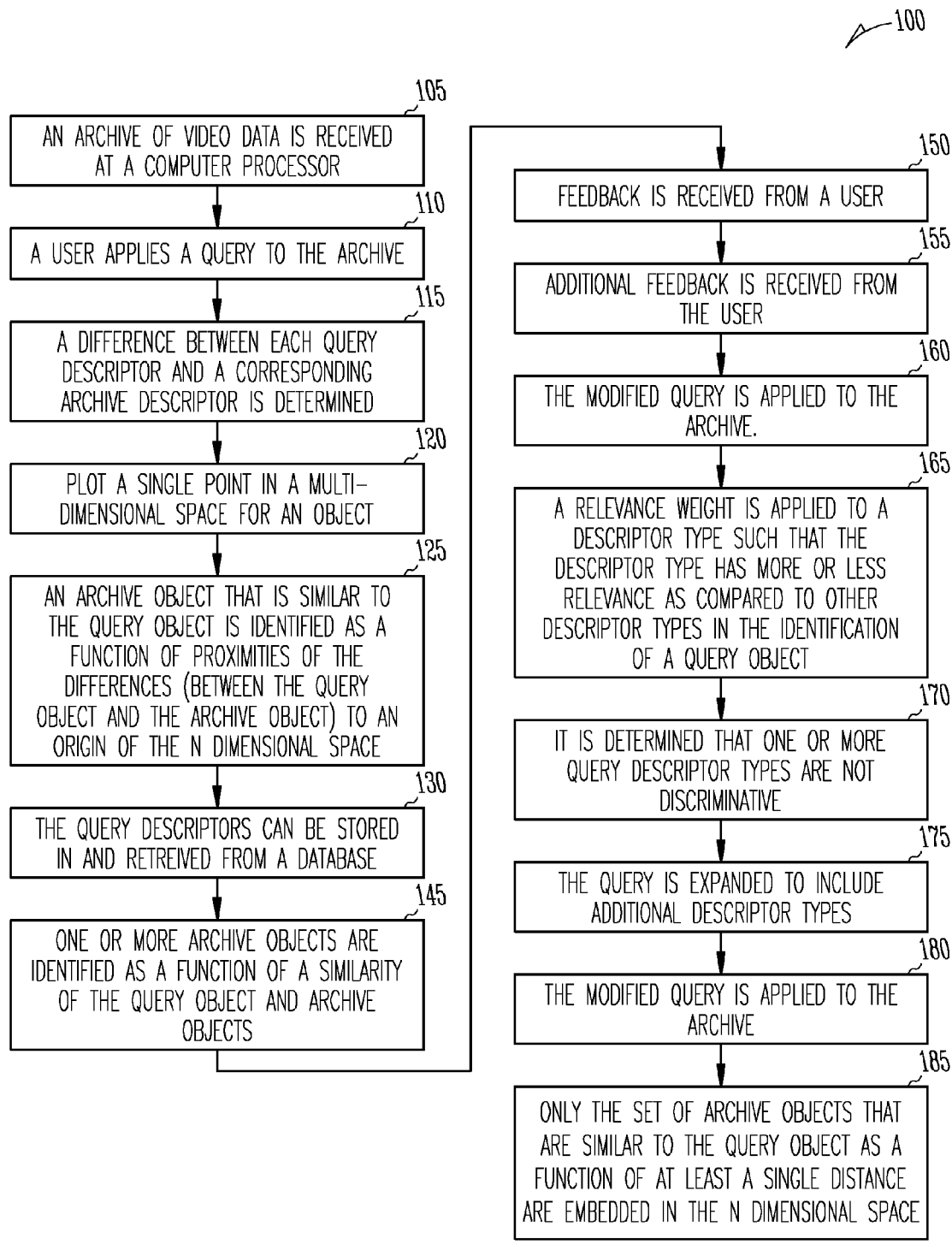
FIG. 1 is a flow chart of an example process of distance space embedding for multi-descriptor matching and retrieval.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)). Consequently, a machine-readable medium can be either tangible or intangible in nature.

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/ apparatus could perform operations different than those discussed with reference to the flow diagrams.

One or more embodiments disclosed herein relate to video object recognition and retrieval based on heterogeneous sets of descriptors. These embodiments can employ all information, i.e., all descriptor types, known about the relevant video data at hand.

The one or more embodiments allow for the use of all descriptor types in a recognition and retrieval setting, and address the recognition, retrieval, and refinement of a return set based on user feedback. While each descriptor type defines its own space, a single item in an archive (i.e., a moving object) will give rise to several descriptors that exist in different spaces and cannot be compared. Consequently, in an embodiment, it is required that each descriptor type have an associated similarity or distance function defined in its respective space. The distance function need not be calibrated or otherwise modified to make them directly comparable across descriptor types.

Distance space embedding is used to perform matching and refinement. Descriptors representing moving objects in the archive are generated, wherein each descriptor has some temporal duration. When retrieving similar instances based on a set of query descriptors, each segment of the moving object's trajectory is represented as a single point in a distance space, wherein its position in each of the dimensions of the distance space is determined by the distance/similarity between the types of query descriptors and the corresponding types of descriptors representing segments of tracks in the archive.

Initial retrieval can be performed by learning a similarity metric in the distance space. The similarity metric is influenced by similarity with respect to each of the descriptor types. Multiple metrics can be learned for different types of searches. For example, a different distance metric could be used for a vehicle track versus a person track. Tracks that are similar to the query will cluster around the origin of an N-dimensional space in one or more dimensions, and this leads to a way to leverage a similarity-based index. However, while embedding a point in the distance space for all tracks would be time consuming, an embodiment only embeds those points that are similar with respect to at least one of the descriptors. That is, the index is used to retrieve and embed only those tracks that will be near the origin along at least one descriptor dimension.

An embodiment can refine retrievals based on user feedback. Additionally, relevance weighting can be applied to the distance space, and this will implicitly perform feature selection. In another embodiment, query expansion can be used to expand a return set beyond the initial set, in the event that one or more descriptors are found not to be discriminative with respect to a particular query.

Since each archive track, as well as each query track, may give rise to multiple descriptors of each type, the reduction of these sets to a single distance value can be done in a number of different ways. Depending on the embodiment, the minimum distance between descriptors might be used, or the mean, median, or maximum distance between the descriptors might be used. For example, if a user was trying to identify archive tracks that are not similar to a query track, then a maximum distance might be used.

As noted above, the use of an index to support searches against large archives requires that each set of descriptors be organized in a data structure that allows for similarity searching. This requires that each descriptor have an associated distance or similarity function defined.

Figure 5:
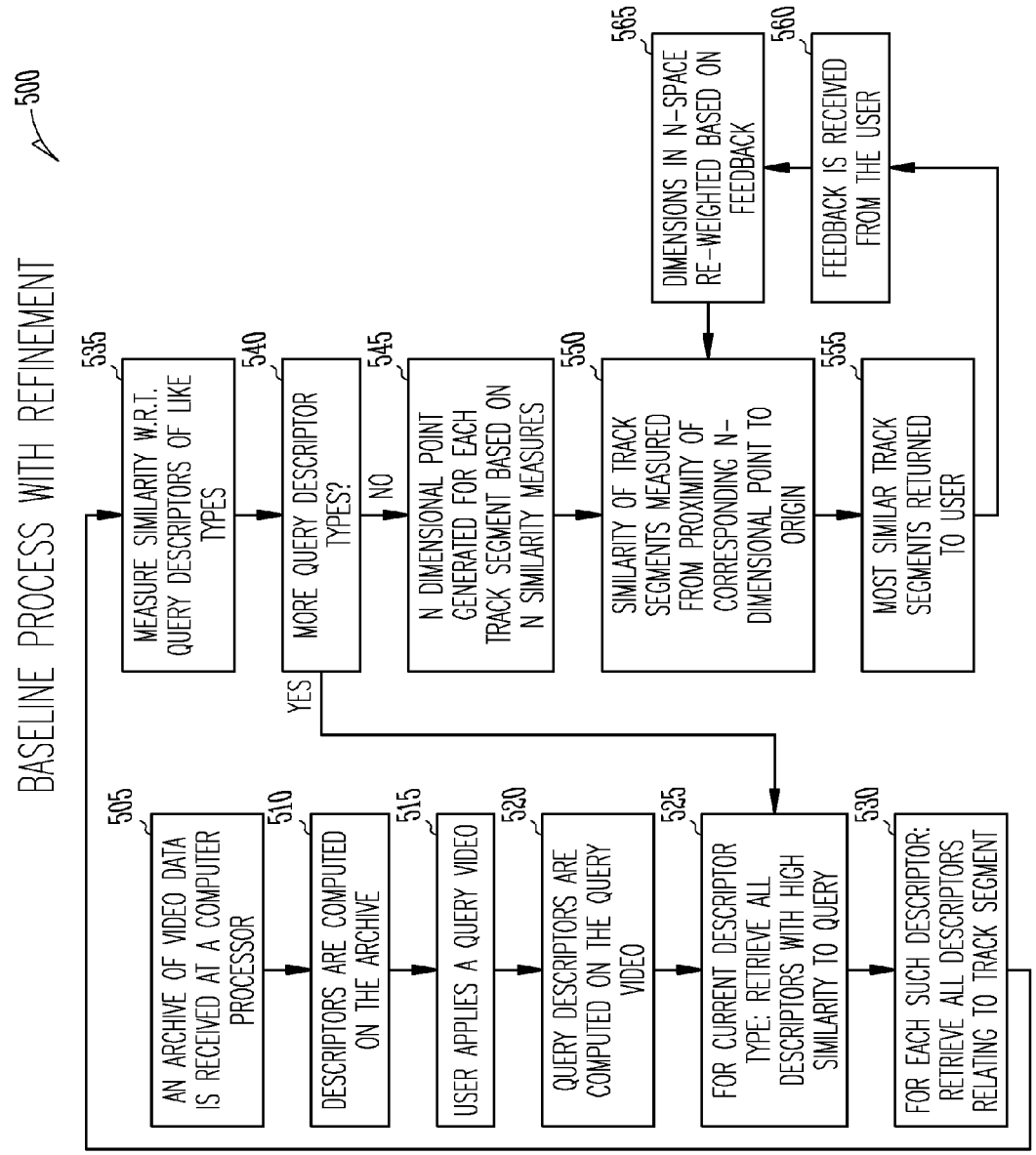
FIG. 5 is a flow chart of another example process of distance space embedding for multi-descriptor matching and retrieval.

FIGS. 1 and 5 are flowcharts of example processes 100 and 500 that match and retrieve objects from video data using a distance space embedding technique for multiple descriptors. FIG. 1 includes a number of process blocks 105-185, and FIG. 5 includes a number of process blocks 505-565. Though arranged substantially serially in the examples of FIGS. 1 and 5, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Figure 4:
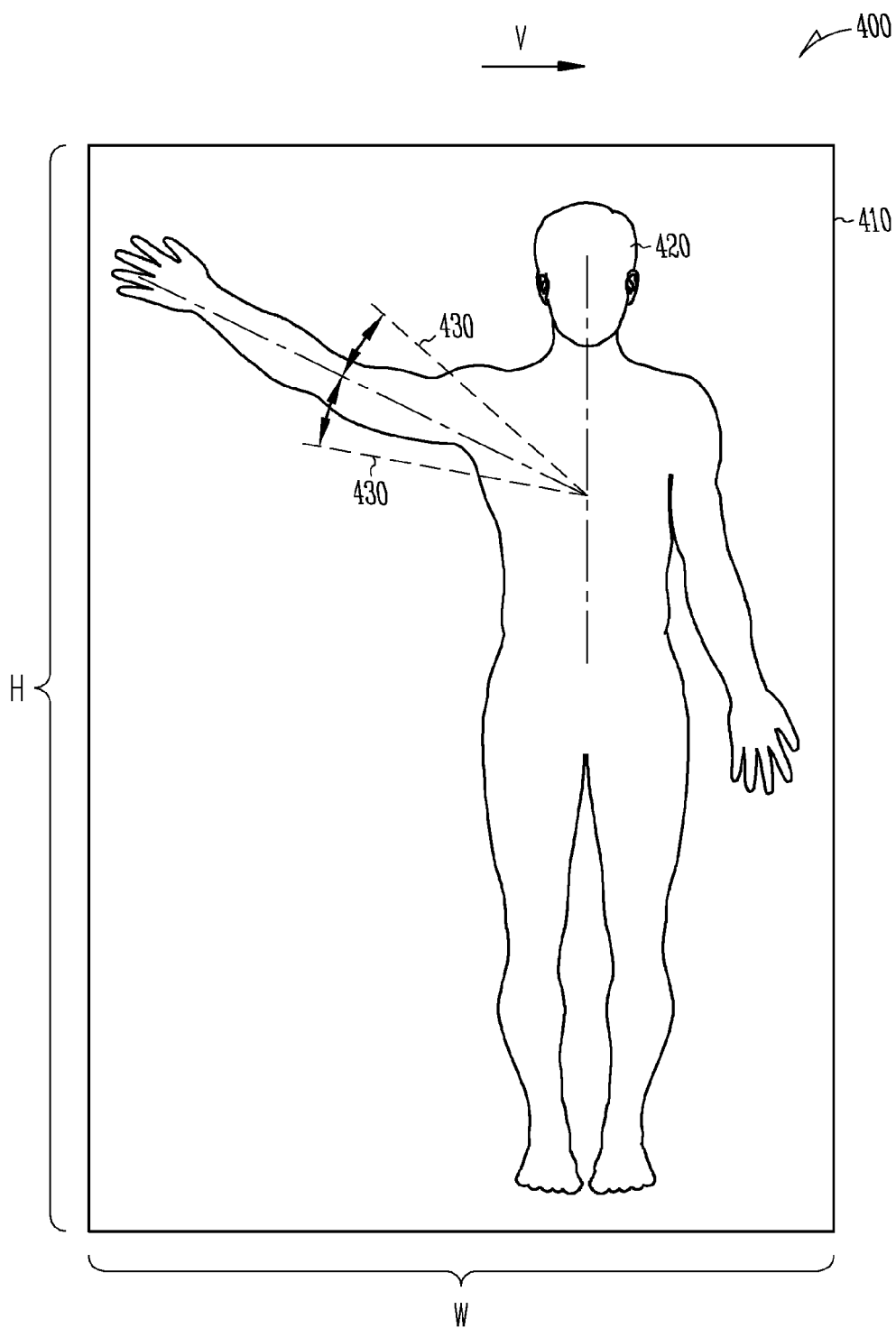
FIG. 4 illustrates a person object in video data.

Referring specifically to the first example in FIG. 1, at 105, an archive of video data is received at a computer processor. The video data can include virtually any scene such as a parking lot, an airport terminal, a town or city plaza, or a shopping mall, just to name a few examples. The video data is processed, and a plurality of descriptor types are computed. As a simple example, the descriptor types for an object in the archive video data may include height, width, speed, and motion of the object over some time range. For example, as illustrated in view 400 of FIG. 4, a frame 410 includes a depiction of a person 420. The person has a width W, height H, and may have a velocity V. The person 420 may also have a particular body movement, such as the waving of a hand at 430. These descriptor types are used to identify objects in the archive video data, such as people, since people in the video data will generally be of a known height, width, speed, and motion. One of skill in the art will realize this is a simplified example, and in practice, a video data processing system that is used to process video data from any public or private area in which there are several objects can have up to 1,000 or more complex descriptors.

At 110, a user applies a query to the archive. The query includes a number of query descriptors of different types, or a query video from which such descriptors may be computed. These query descriptors are compared to the descriptors which represent the archive video data to match a query object with an archive object, and retrieve that archive object if it matches the query object. As noted in the simple example above, such matching can include comparing the height of a query object with an archive object, the width of a query object with an archive object, the expected speed of a query object with the speed of an archive object, and any potential articulated motion of a query object with that of the archive object. In some embodiments, a user is looking to identify any object, such as any person that may come into the field of view of the system. In another embodiment, the user is hoping to identify a particular individual or a particular object, such as a particular type of automobile, and even a particular automobile. In this second embodiment, discriminating features such as color or texture can be used.

Figures 2, 3A, 3B:
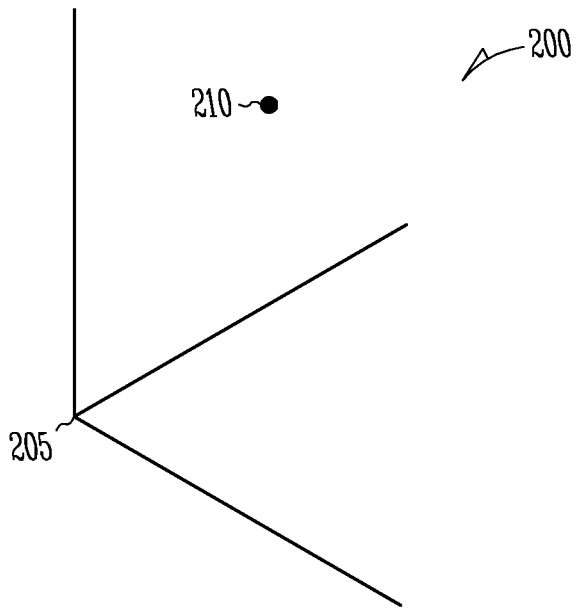
FIG. 2 is a representation of an N-dimensional distance space wherein N is equal to 3.
FIG. 3A illustrates calculations using video data from archive video data and a query.
FIG. 3B illustrates a vector space resulting from the calculations of FIG. 3A.

At 115, a difference between each query descriptor and a corresponding archive descriptor is determined. This difference can be thought of as a simple distance. FIGS. 3A and 3B illustrate an example of this process. In FIG. 3A, the differences between a width, height, velocity, and motion of an archive from the weight, height, velocity, and motion of a query, are determined. This results in several points $P_x$, which can be placed in a distance space vector as illustrated in FIG. 3B. Thereafter, the points $P_x$ are placed into an N-dimensional space such as in FIG. 2. As a specific example and referring to FIG. 2, if the descriptor is a height, the difference between the query object and the archive object may be 2 pixels, so the difference or distance in such a case is 2. Then, if the differences between width descriptors and speed descriptors are 3 and 5 respectively, at 120, this results in a single point 210 for this object in a multi-dimensional space at (2,3,5) as indicated in FIG. 2, which is a certain distance from the origin 205. Of course, for any practical implementation of a distance-space embedding system, N will be much greater than 3, and practical implementations are not amenable to a visual representation of the N dimensional space.

At 125, an archive object that is similar to the query object is identified as a function of proximities of the differences (between the query object and the archive object) to an origin of the N dimensional space. At 130 it is noted that the query descriptors can be stored in and retrieved from a database.

In one or more embodiments, feedback can be received from a user in order to refine a recognition or retrieval. For example, at 145, one or more archive objects are identified as a function of a similarity of the query object and archive objects. At 150, feedback is received from a user. This feedback can include an indication of whether a particular archive object is similar to a query object. At 155, additional feedback is received from the user. This additional feedback includes a modification of the query. For example, if the original set of descriptors recognizes and retrieves objects that are simply of no interest to the user, the user can submit additional descriptor types in order to narrow the recognitions and retrievals. At 160, the modified query is applied to the archive, which should generate a different set of objects that are recognized and retrieved.

At 165, a relevance weight is applied to a descriptor type such that the descriptor type has more or less relevance as compared to other descriptor types in the identification of a query object. This feature permits the identification of a descriptor type or feature that is more important than others, and which will be accorded more weight in the recognition and retrieval of archive objects. For example, if a user is searching for a known person within the confines of an airport terminal, and the user knows that this sought after person is quite tall, then any descriptor type relating to the height of such person can be given greater weight. This increased weight to the height descriptor type will narrow any objects returned in the recognition and retrieval steps of the system.

If too many objects are recognized and retrieved from the archive video data, this means that the descriptor types are not discriminative. In one or more embodiments, the query can be expanded by adding or removing descriptor types in order to narrow the set of the objects recognized and retrieved. The query can also be expanded by placing the user-provided query descriptors with descriptors corresponding to an archive track identified by a user as being a match. Specifically, at 170, it is determined that one or more query descriptor types are not discriminative. At 175, the query is expanded to include additional descriptor types, and at 180, the modified query is applied to the archive. In an embodiment, this expansion can be an automatic feature of the system. In another embodiment, the expansion can be based on user feedback and user input.

At 185, only the set of archive objects that are similar to the query object as a function of at least a single distance are embedded in the N dimensional space. This single distance represents a distance between a single query descriptor and a single archive descriptor.

Referring to the second example in FIG. 5, at 505, an archive of video data is received at a computer processor, and descriptors are computed on the archive at 510. At 515, a user applies a query video. At 520, the computer processor computes query descriptors on the query video. At 525, a loop is entered, the loop consisting of blocks 525-540, wherein for a current descriptor type, all descriptors that have a high similarity to the query are retrieved. Then, at 530, for each such similar descriptor, all descriptors relating to a track segment are retrieved. At 535, the similarity is measured with respect to query descriptors of like types. The loop terminates at 540, wherein if there are more descriptor types, the process returns to block 525, and if there are no more query descriptor types, the process proceeds to block 545.

At 545, an N-dimensional point is generated for each track segment. The N-dimensional point is further based on N similarity measures. At 550, the similarity of the track segments is measured from the proximity of the corresponding N-dimensional point to the origin of the N-dimensional space. At 555, the most similar tracks are returned to the user. At 560, feedback is received from the user, and at 565, the dimensions in the N-dimensional space are re-weighted based on any user feedback.

Figure 6:
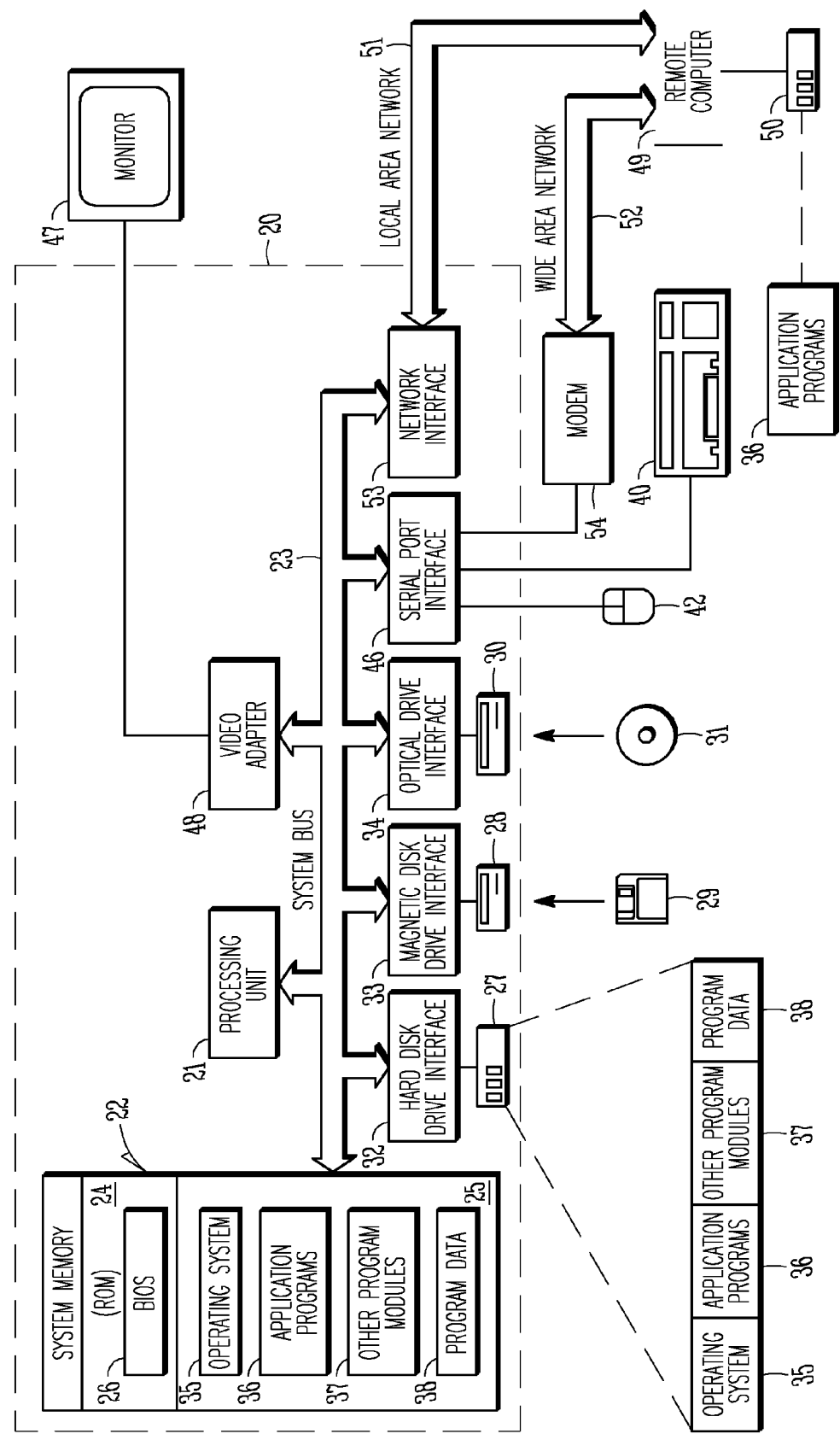
FIG. 6 is a block diagram of a computer system upon which one or more embodiments can operate.

FIG. 6 is an overview diagram of a hardware and operating environment in conjunction with which embodiments of the invention may be practiced. The description of FIG. 6 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 6 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for distance space embedding for multi-descriptor matching and retrieval has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A computerized process comprising:
   receiving, at a computer processor, an archive of video data from which a plurality of archive descriptor types are extracted;
   applying, using the computer processor, a query to the archive, the query comprising a number of N query descriptor types for a query object;
   determining, using the computer processor, a difference between each query descriptor type and corresponding descriptor types of track segments in the archive, and storing the differences in one or more vectors;
   storing each vector of differences in a computer storage medium as a point in an N dimensional space; and
   identifying, using the computer processor, an archive object that is similar to the query object as a function of proximities of the differences to an origin in one or more dimensions of the N dimensional space.

2. The process of claim 1, wherein the query descriptors are stored in and retrieved from a database.

3. The process of claim 1, comprising:
   identifying one or more archive objects as a function of a similarity of the query object and the archive objects;
   receiving feedback from a user, the feedback comprising an indication of whether a particular archive object is similar to the query object; and
   applying the received feedback to modify the query results.

4. The process of claim 1, comprising applying a relevance weight to a descriptor type such that the descriptor type has more or less relevance as compared to other descriptor types in the identification of the archive object.

5. The process of claim 1, comprising:
   determining that one or more query descriptors are not discriminative;
   expanding the query to include additional descriptor types; and
   applying the expanded query to the archive.

6. The process of claim 5, wherein the query is expanded by one or more of an automatic process and a process using feedback from a user.

7. The process of claim 1, wherein only the set of archive objects that are similar to the query object as a function of at least a single distance are embedded in the N dimensional space.

8. A computerized process comprising:
   receiving, at a computer processor, an archive of video data;
   computing, using the computer processor, descriptors on the archive;
   receiving, at the computer processor, a query video;
   computing, using the computer processor, query descriptors on the query video;
   determining, using the computer processor, a difference between each query descriptor type and corresponding descriptor types of track segments in the archive, and storing the differences in one or more vectors;
   storing each vector of differences in a computer storage medium as a point in an N dimensional space;
   retrieving a first set of descriptors with a high similarity to the query video for a particular descriptor type;
   retrieving a second set of descriptors relating to a track segment for each descriptor in the first set of descriptors; and
   measuring a similarity between a descriptor of the track segment and a query descriptor, the descriptor of the track segment and the query descriptor comprising the particular descriptor type.

9. The computerized process of claim 8, comprising generating an N-dimensional point for each track segment based on N similarity measures.

10. The computerized process of claim 9, wherein the similarity of track segments is measured from a proximity to the origin of the corresponding N-dimensional space.

11. The computerized process of claim 8, comprising returning a set of the most similar tracks to a user.

12. The computerized process of claim 11, comprising:
   receiving feedback from a user; and
   re-weighting dimensions in the N-dimensional space based on the feedback from the user.

13. A tangible computer readable storage device storing instructions, which, when executed by a processor, cause the processor to perform a process comprising:
   receiving, at a computer processor, an archive of video data from which a plurality of archive descriptor types are extracted;
   applying, using the computer processor, a query to the archive, the query comprising a number of N query descriptor types for a query object;
   determining, using the computer processor, a difference between each query descriptor type and corresponding descriptor types of track segments in the archive, and storing the differences in one or more vectors;
   storing each vector of differences in a computer storage medium as a point in an N dimensional space;
   identifying, using the computer processor, an archive object that is similar to the query object as a function of proximities of the differences to an origin in one or more dimensions of the N dimensional space.

14. The tangible computer readable storage device of claim 13, wherein the query descriptors are stored in and retrieved from a database.

15. The tangible computer readable storage device of claim 13, comprising instructions which when executed by a processor perform a process comprising:
   identifying one or more archive objects as a function of a similarity of the query object and the archive objects;
   receiving feedback from a user, the feedback comprising an indication of whether a particular archive object is similar to the query object; and
   applying the received feedback to modify the query results.

16. The tangible computer readable storage device of claim 13, comprising instructions which when executed by a processor perform a process comprising applying a relevance weight to a descriptor type such that the descriptor type has more or less relevance as compared to other descriptor types in the identification of the archive object.

17. The tangible computer readable storage device of claim 13, comprising instructions which when executed by a processor perform a process comprising:
   determining that one or more query descriptors are not discriminative;
   expanding the query to include additional descriptor types; and
   applying the expanded query to the archive.

18. The tangible computer readable storage device of claim 17, wherein the query is expanded by one or more of an automatic process and a process using feedback from a user.

19. The tangible computer readable storage device of claim 13, wherein only the set of archive objects that are similar to the query object as a function of at least a single distance are embedded in the N dimensional space.

20. The tangible computer readable storage device of claim 13, comprising instructions which when executed by a processor perform a process comprising:
   receiving feedback from a user; and
   re-weighting dimensions in the N-dimensional space based on the feedback from the user.

* * * * *